(12) United States Patent
Kriebel et al.

(10) Patent No.: US 8,137,730 B2
(45) Date of Patent: Mar. 20, 2012

(54) POWER SPRAYING OF AGRICULTURAL PRODUCTS WITH WRINKLED SKINS

(75) Inventors: Barry F. Kriebel, Kingsburg, CA (US); James M. Henderson, Kingsburg, CA (US)

(73) Assignee: Sun-Maid Growers of California, Kingsburg, CA (US)

( * ) Notice: Subject to any disclaimer, the term of this patent is extended or adjusted under 35 U.S.C. 154(b) by 986 days.

(21) Appl. No.: 12/114,445

(22) Filed: May 2, 2008

(65) Prior Publication Data

US 2009/0162505 A1    Jun. 25, 2009

Related U.S. Application Data

(60) Provisional application No. 61/015,685, filed on Dec. 21, 2007.

(51) Int. Cl.
*A23L 1/015* (2006.01)
(52) U.S. Cl. ........ 426/615; 426/335; 426/465; 426/506; 426/531; 426/640
(58) Field of Classification Search .................. 426/615, 426/640, 465, 506, 335, 531
See application file for complete search history.

(56) References Cited

U.S. PATENT DOCUMENTS

| | | | |
|---|---|---|---|
| 2,084,062 A * | 6/1937 | Nedvidek et al. | 426/308 |
| 2,256,700 A * | 9/1941 | Armstrong | 426/442 |
| 3,354,923 A | 11/1967 | Voller | |
| 3,996,386 A * | 12/1976 | Malkki et al. | 426/321 |
| 4,169,787 A | 10/1979 | Gunnerson | |
| 4,411,038 A | 10/1983 | Mukai | |
| 4,434,185 A * | 2/1984 | Nelson | 426/308 |
| 5,073,400 A | 12/1991 | Bruno et al. | |
| 5,411,755 A * | 5/1995 | Downton et al. | 426/599 |
| 6,453,830 B1 | 9/2002 | Zauderer | |
| 6,722,295 B2 | 4/2004 | Zauderer | |
| 2005/0172595 A1 | 8/2005 | Wells et al. | |
| 2007/0267330 A1 | 11/2007 | Mukai | |

FOREIGN PATENT DOCUMENTS

| | | |
|---|---|---|
| GB | 871468 | 6/1961 |
| JP | 63158142 A2 | 7/1988 |
| JP | 6315814 A2 | 11/1994 |
| WO | WO 03/050044 A1 | 6/2003 |

OTHER PUBLICATIONS

Warmerdam, Beth; "Raisin crops questionable after rain"; 2006, The Selma Enterprise, 5 pages.

* cited by examiner

*Primary Examiner* — Helen F Heggestad
(74) *Attorney, Agent, or Firm* — Kilpatrick Townsend & Stockton LLP.; M. Henry Heines

(57) ABSTRACT

Raisins that have been formed by field drying of grapes and that have been exposed to rain during the drying process that has caused solids, particularly sand, to become embedded in the surface folds of the raisins, are cleaned of such embedded solids by spraying with a mixture of pressurized air and water applied through an atomizing nozzle, which achieves both washing and drying of the raisins. The same process is applicable to other agricultural products with wrinkled skins, and produces unusually effective results.

20 Claims, No Drawings

POWER SPRAYING OF AGRICULTURAL PRODUCTS WITH WRINKLED SKINS

CROSS-REFERENCE TO RELATED APPLICATION

This application claims the benefit of U.S. Provisional Patent Application No. 61/015,685, filed Dec. 21, 2007, the contents of which are incorporated herein by reference in their entirety.

BACKGROUND OF THE INVENTION

1. Field of the Invention

This invention resides in the field of food processing, with particular interest in the processing of dried fruits.

2. Description of the Prior Art

The conventional process for drying grapes to make raisins entails field drying of the grapes in the sun. While generally effective and economical, field drying exposes the raisins to sand, dry leaves, and other particulate matter, and this exposure requires that the raisins be rinsed thoroughly before they can be packaged and sold. Proper cleaning is needed to meet standards imposed by the United States Department of Agriculture whose standard for Grade A raisins is no more than five units of sand per 250 grams of raisins and for Grade B raisins no more than six units per 250 grams, a unit being equal to 0.0588 cubic centimeters, as extracted and measured by a specified procedure. Commercial raisin buyers typically impose an even higher standard of either no sand at all or at most a trace amount. Wind exposure during the drying stage causes sand and dirt to be blown over the raisins, and heavy rain aggravates the problem since raindrops splashing onto the grapes carry even more sand with them. In both cases, the sand becomes embedded in the wrinkles that are formed when the grapes dry. Embedded sand is one of the most difficult particulates to remove and can be detrimental both to the economics of raisin production and to the raisins themselves.

Raisins with embedded sand are only one example of agricultural products that have wrinkled surfaces with undesirable particulate matter embedded in the wrinkles. Dried fruits in general are susceptible to clinging particles, and examples in addition to raisins are prunes, apricots, figs, peaches and cranberries. The embedded particles include not only sand and topsoil, but also in some cases shredded paper from coding stickers and other types of debris. The economic impact of all such debris is exemplified by the economics of raisin processing, which are a prominent example of the problem.

In raisin processing, conventional rinsing is often inadequate to remove the embedded sand, particularly when the sand is highly adherent or of a large quantity, or both. Removal of the sand can be achieved by puffing out the raisins in hot water, re-rinsing the puffed raisins, and then re-drying them in natural gas-fired dehydrators. The exposure to heated water in this process however tends to leach sugar from the raisins. This lessens the appeal of the raisins, and the puffing and re-rinsing steps add to the water consumption of the process and to the overall cost. Even with these extra processing steps, a measurable amount of the product is often lost, and the cost of a heavy rain to growers can amount to as much as 25-30% of the value of the crop.

SUMMARY OF THE INVENTION

It has now been discovered that an unusually efficient removal of particulate matter from agricultural products with wrinkled surfaces can be achieved by spraying the products with a fluid composition that includes a combination of water and compressed air applied through one or more atomizing nozzles. By virtue of its inclusion of both water and air, the combination spray both washes and dries the product. This process is of use in removing embedded particles in general, including sand, soil, dust, leaf matter, microbes, and any other solid debris that comes into contact with the product. As noted above, the process is of particular value and interest in removing embedded sand from raisins, and more particularly those that are dried by the sun when they are spread in layers over sheets placed on the ground or close to the ground. By using a combined spray of water and compressed air in accordance with this invention, the step of puffing the raisins with hot water can be eliminated, as can the subsequent drying and re-rinsing steps described above. Analogous benefits are gained with other dried fruits and agricultural products in general with wrinkled skins.

DETAILED DESCRIPTION OF THE INVENTION AND PREFERRED EMBODIMENTS

As noted above, this invention is applicable to agricultural products in general with wrinkled skins. Examples of such products are raisins, prunes, dried apricots, dried peaches, dried cherries, and dried figs. The invention is preferably applied to raisins, prunes, dried apricots, and dried figs, and most preferably applied to raisins. Among raisins, the invention is applicable to Thompson seedless raisins, golden seedless raisins, muscat raisins, sultana raisins, and currants. For purposes of illustration, the following description will focus on how the invention is applied to raisins, but the general principles are readily adaptable to other agricultural products with wrinkled skins.

As in the conventional process for raisin processing, the raisins in the practice of this invention can be placed in a shaker with slotted screens supporting the raisins in a layer, the shaker causing the layer to move in a generally linear direction past a spray nozzle or a linear array of spray nozzles. Typically, the layer of berries is approximately one-half inch in thickness, or 1-2 raisins in depth, and the width of the layer is approximately 2 to 6 feet (0.6 to 1.8 meter), preferably about 3 feet (approximately 1 meter), perpendicular to the direction of travel of the layer. The operation of the shaker causes the layer to travel at an overall velocity of approximately 1 to 2 feet per second. Shakers of this type are described in Mukai, U.S. Pat. No. 4,411,038, issued Oct. 25, 1983; Bruno et al., U.S. Pat. No. 5,073,400, issued Dec. 17, 1991; and Gunnerson, U.S. Pat. No. 4,169,787, issued Oct. 2, 1979.

While the water spray in the prior art is typically applied at a rate of approximately 5 gal/min (0.3 liter per second) over a narrow strip (approximately 1 to 3 inches, equivalent to approximately 2.5-7.6 cm) spanning the width of the moving layer of raisins, the water in the combined water-and-air mixture of this invention can be applied at a rate as low as 1 gal/min (0.06 liters per second) over the same area with air at a rate of 3 cubic feet per minute (1.4 liters per second) or more at 20 psig (2.4 atmospheres). Preferred ranges for application rates are about 1 to about 5 gal/min of water (0.06 to 0.3 liters per second) and about 1 to about 20 cubic feet per minute (0.5 to 9.4 liters per second) of air at 20 psig (2.4 atm), in the same spray configuration. In a presently preferred process, the application rate of water is about 3 gal/min (0.19 liters per second) and the application rate of air is about 20 cubic feet per minute (9.4 liters per second) at 25 psig (2.7 atm), again in the same spray configuration of a narrow strip spanning a 3-foot (approximately 1-meter) width. The temperature of the combined spray is not critical to the invention and can vary. In general, the temperature for best results will be within the range of from about 54° F. (12° C.) to about 167° F. (75° C.), preferably from about 60° F. (16° C.) to about 130° F. (54° C.), and most preferably from about 100° F. (38° C.) to about 110° F. (43° C.).

In certain embodiments of the invention, the fluid composition contains nothing more than water and air, the water being potable water, while in others the water is supplemented with an oxidizer or other additives. Electrochemically activated water (referred to in the industry by the acronym ECA) is an example of water supplemented with an oxidizer, and is produced by passing a dilute saline (or other salt) solution through an electrolytic cell and recovering the anolyte which has an antimicrobial effect. An example of electrochemically activated water is NAPASAN, a product of NAPASOL AG, Reinach, Switzerland, and a description of electrochemically activated water is found in International Patent Application Publication No. WO 2003/050044 A1, publication date 19 Jun. 2003 (Radical Waters (IP) (PTY) Limited, applicant). Examples of sanitizing agents and antimicrobial agents that can be used with or without electrochemical activation are hydrogen peroxide and other peroxides, as well as percarbonates, hypochlorites, perphosphates, persulphates, and persilicates, with sodium and potassium as the preferred cation. Acid detergents and sanitizers can also be used. Examples are sorbic acid and sorbates, acetic acid and acetates, and lactic acid. Among these, potassium sorbate and sodium sorbate are preferred.

Streams of water and air, or of an aqueous solution and air, can be achieved by use of conventional atomizing spray nozzles. Nozzles with spray configurations of any shape, such as conical sprays, sprays of uniform diameter, and fan-shaped sprays, can be used. Expanding sprays such as conical sprays or fan-shaped sprays offer the advantage of covering a larger area than the nozzle itself. With a moving layer of products, fan-shaped sprays are generally the most efficient. Examples are those sold by McMaster-Carr Company, New Brunswick, N.J., USA, and by Spraying Systems Company, Wheaton, Ill., USA. An example of a single nozzle that produces a flat fan-shaped spray is Nozzle Model SU85 of Spraying Systems Company. At 36 psig (3.45 atm) air pressure and 35 psig (3.38 atm) water pressure, this nozzle produces a flow rate of 3 gallons per minute (0.19 liters per second) and droplets of approximately 100 to 300 microns in diameter, in a divergence angle of about 120°. Other nozzles from other manufacturers can be used to produce similar or equivalent flow configurations and flow rates. Nozzles that produce a spray that strikes the moving layer of product at an angle offer the further benefit of agitation of the products to expose a maximum proportion of the product surface to the spray. The spray can be either a continuous spray or a pulsating spray. In certain embodiments, a pulsating spray can offer the advantage of achieving a high impact with economical water usage. Pulse rates can vary widely; effective results in most cases are generally achieved with a pulse rate of 10 to 100 pulses per second.

While the foregoing description describes certain means of implementing the invention that are believed to be the most efficient as of the filing date of this application, further alternatives that are within the scope of the invention will be apparent to those of skill in the art of raisin processing and the processing of agricultural products in general, and in the use of atomizing nozzles. For example, any inert gas can be used in place of air, and the water-and-air spray can be applied either in a continuous-flow process as described above or in a batch process, or a combination continuous and batch process. A row of individual nozzles can be used in place of the single nozzle, and the flow configuration can either be a narrow spray spanning the width of the moving layer of product as described above or a spray over a broader area of any shape. Still further variations and alternatives will be apparent to those of experience in the industry.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. All patents, patent applications, and other published reference materials cited in this specification are hereby incorporated herein by reference in their entirety. Any discrepancy between any reference material cited herein and an explicit teaching of this specification is intended to be resolved in favor of the teaching in this specification. This includes any discrepancy between an art-understood definition of a word or phrase and a definition explicitly provided in this specification of the same word or phrase.

What is claimed is:

1. A process for treating agricultural products with wrinkled surfaces to remove particulate matter embedded in the wrinkles of said surfaces, said process comprising spraying said agricultural products with a fluid composition through an atomizing nozzle, said fluid composition comprising pressurized water and air.

2. The process of claim 1 wherein said agricultural products are sun-dried fruits.

3. The process of claim 1 wherein said agricultural products are a member selected from the group consisting of raisins, prunes, apricots, peaches, cherries, and figs.

4. The process of claim 1 wherein said agricultural products are a member selected from the group consisting of raisins, prunes, apricots, and figs.

5. The process of claim 1 wherein said agricultural products are raisins.

6. The process of claim 1 comprising spraying said fluid composition in a pulsating spray over said agricultural products.

7. The process of claim 1 comprising spraying said fluid composition in a continuous spray over said agricultural products.

8. The process of claim 1 wherein said pressurized water is electrochemically activated water.

9. The process of claim 1 wherein said fluid composition further comprises a sanitizing agent.

10. The process of claim 9 wherein said sanitizing agent is a member selected from the group consisting of hydrogen peroxide, a metal peroxide, a metal percarbonate, a metal hypochlorite, a metal perphosphonate, a metal persulphate, and a metal persilicate.

11. The process of claim 9 wherein said sanitizing agent is a member selected from the group consisting of sorbic acid, a metal sorbate, acetic acid, a metal acetate, and lactic acid.

12. The process of claim 1 further comprising an antimicrobial agent selected from the group consisting of potassium sorbate and sodium sorbate.

13. The process of claim 1 wherein said agricultural products are raisins and said particulate matter comprises embedded sand.

14. The process of claim 1 wherein said fluid composition is sprayed at a temperature of from about 12° C. to about 75° C.

15. The process of claim 1 wherein said agricultural products are raisins and said fluid composition is sprayed at a temperature of from about 16° C. to about 54° C.

16. The process of claim 1 wherein said agricultural products are raisins and said fluid composition is sprayed at a temperature of from about 38° C. to about 43° C.

17. The process of claim 1 wherein said agricultural products are raisins and said process comprises directing a stationary spray of said fluid composition over a continuously moving layer of said raisins.

18. The process of claim 17 wherein said stationary spray is a fan-shaped spray.

19. The process of claim 1 wherein said fluid mixture consists of potable water and air.

20. The process of claim 1 comprising spraying said fluid mixture at a spray rate of about 1 to about 5 gallons per minute of water and about 1 to about 20 cubic feet per minute of air.

* * * * *